United States Patent
Griepentrog et al.

(10) Patent No.: US 6,594,592 B1
(45) Date of Patent: Jul. 15, 2003

(54) METHOD AND DEVICE FOR DETERMINING THE TORQUE OF AN INDUCTION MACHINE

(75) Inventors: Gerd Griepentrog, Gutenstetten (DE); Diethard Runggaldier, Stegaurach (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/787,717

(22) PCT Filed: Sep. 9, 1999

(86) PCT No.: PCT/DE99/02858

§ 371 (c)(1),
(2), (4) Date: Mar. 21, 2001

(87) PCT Pub. No.: WO00/17616

PCT Pub. Date: Mar. 30, 2000

(30) Foreign Application Priority Data

Sep. 21, 1998 (DE) .......................... 198 43 134

(51) Int. Cl.[7] .............................................. G06F 19/00
(52) U.S. Cl. .................. 702/41; 702/189; 702/190; 318/439
(58) Field of Search ................ 318/790, 806, 318/807, 808, 809, 810, 811, 812, 439; 702/41, 189, 190, 191, 194

(56) References Cited

U.S. PATENT DOCUMENTS 5,811,957 A * 9/1998 Bose et al. ............... 318/802

FOREIGN PATENT DOCUMENTS

| DE | 1806769 | 3/1972 |
|----|---------|--------|
| DE | A1-3303454 | 8/1984 |
| DE | A1621680 | 10/1994 |
| DE | C2-4229554 | 12/1994 |
| DE | A1-19532477 | 3/1996 |
| JP | A5679223 | 6/1981 |

OTHER PUBLICATIONS

Hurst et al., IEEE, pp. 749–753 (1997).

* cited by examiner

Primary Examiner—John Barlow
Assistant Examiner—Stephen J. Cherry
(74) Attorney, Agent, or Firm—Harness, Dickey & Pierce, P.L.C.

(57) ABSTRACT

In a method and device for determining the torque of an induction machine, stator terminal voltages and the stator terminal currents are integrated and then high-pass filtered to determine a space vector of the concatenated stator flux. The torque is calculated therefrom by multiplication by a complex correction factor.

23 Claims, 2 Drawing Sheets

METHOD AND DEVICE FOR DETERMINING THE TORQUE OF AN INDUCTION MACHINE

This application is the national phase under 35 U.S.C. §371 of PCT International Application No. PCT/DE99/02858 which has an International filing date of Sep. 9, 1999, which designated the United States of America.

FIELD OF THE INVENTION

The invention relates to a method for determining the torque of an induction machine, in which the stator terminal voltages and the stator terminal currents are used. This is preferably done by means of integration and subsequent high-pass filtering, to determine a filtered space vector, from which the DC component has thus been removed, of the concatenated stator flux. In addition, the invention relates to an associated device for carrying out a method, having a measurement device for detecting the stator terminal voltages and the stator terminal currents, and having a computation device for determining a filtered space vector of the concatenated stator flux.

BACKGROUND OF THE INVENTION

For drive tasks with induction machines, it is important to know the torque developed by the induction machine, since such knowledge is the only way to specifically regulate the torque of the induction machine. By way of example, devices for determining the torque in such induction machines are known from DE 42 29 554 C2 and JP 56-79223 A, with the torque being formed by means of electronic components in what is known as a computation circuit. In both publications, electronic high-pass filters are used to suppress DC components when determining the concatenated stator flux.

Indirect torque control is known from EP 0 621 680 A1, in which the power in at least one of the three phases is regulated at a constant value. A disadvantage in this case is that no direct relationship can be specified between the power and the torque, so that the torque can necessarily be regulated only inaccurately using the known method.

A further method for determining the torque from the concatenated stator flux and the stator current, that is to say by measuring purely electrical variables and thus not using a separate torque sensor, is disclosed, for example, in DE 195 32 477 A1. The aim in this case is to regulate a torque of 0 by synchronizing the stator and rotor flux. In this case, the space vector of the concatenated stator flux revolves at the rotor angular velocity, so that the speed of the machine can be determined indirectly from the fundamental frequency of the supplying frequency-converter voltage. The cited document does not, however, describe how the concatenated stator flux is determined without accumulating errors which necessarily occur in the recording and processing of measured values and which lead to intolerable discrepancies when determining the torque.

SUMMARY OF THE INVENTION

The invention is now based on the object of specifying a method which is as simple and accurate as possible for determining the torque developed by the induction machine using only electrical variables, in which case the errors caused by numerical integration and the necessary high-pass filtering are largely corrected.

In addition, the invention is based on the object of specifying a device for carrying out the method.

According to the invention, the first-mentioned object is achieved by means of a method having the features of patent claim 1 for example. In the method according to the invention for determining the torque of an induction machine, the stator terminal voltages and the stator terminal currents are used, by means of numerical integration and subsequent high-pass filtering, to determine a filtered space vector of the concatenated stator flux. Further, the torque is calculated from this by multiplication by a complex correction factor. The multiplication by the complex correction factor corrects the amplitude and phase errors which are caused by numerical integration and high-pass filtering and are each related to the fundamental of the power supply system voltage. As such, a value of the flux concatenation is calculated which is substantially exact with respect to the amplitude and phase of the fundamental of the power supply system voltage.

The aforementioned tasks are achieved according to the invention in the case of a method of the type mentioned initially in that the space vector is multiplied by a complex correction factor and, after the multiplication, the torque is calculated by means of the correction factor. The associated device has a computation device by means of which, in addition to determining the filtered space vector, this is multiplied directly by a complex correction factor. Thus, it is once again possible to calculate the torque from the filtered space vector multiplied by the complex correction factor.

The high-pass filtering makes it possible to compensate for errors which occur firstly in the measurement of the current and voltage values and which, secondly, result from the fact that, since the temperature varies with the operating conditions, the value of the electrical resistance of the stator winding, which is required to calculate the stator flux, is not known exactly. Furthermore, the high-pass filtering compensates for any residual error in the integration, thus avoiding any remaining discrepancy or drift in the calculated concatenated stator flux, which would lead to a remaining and/or increasing error in the determination of the torque.

In detail, the following steps are carried out in one advantageous refinement of the method according to the invention:

a) The stator terminal voltages and the stator terminal currents are measured at predetermined time intervals, b) the measured values of the stator terminal voltages and the stator terminal currents are used to calculate the space vector of the stator voltage and, respectively, the space vector of the stator current, c) the space vector of the stator voltage and the space vector of the stator current together with an initial value for the space vector of the concatenated stator flux are used to determine, by numerical integration, an unfiltered space vector of the concatenated stator flux, d) the unfiltered space vector of the concatenated stator flux is multiplied by a predetermined filter factor for high-pass filtering, e) the filtered space vector, determined in this way, of the concatenated stator flux is used as the initial value for the next numerical integration step, and f) is multiplied by a complex correction factor in order to calculate the present torque of the induction machine.

Thus, in this refinement of the method, a numerical integration method is used to determine the concatenated flux from current and voltage signals sampled at predetermined time intervals.

In one preferred refinement of the invention, the computation device includes a first computation unit for calculating and for storing the space vector of the stator voltage and the space vector of the stator current. It further includes a second computation unit for calculating the space vector of the concatenated stator flux by numerical integration from the stored space vectors of the stator voltage and of the stator current and from an initial value, which is stored in an initial value memory, for the space vector of the concatenated stator flux. A third computation unit is included, connected downstream therefrom, for multiplying the calculated space vector of the concatenated stator flux by a filter factor. Finally, a fourth computation unit is included for calculating the torque from the space vector of the stator current, the space vector of the corrected concatenated stator flux, the number of poles and a correction factor, with the filtered space vector of the concatenated stator flux being passed to the input of the initial value memory.

In a further advantageous refinement of the invention, a control device is provided for controlling the torque of the induction machine as a function of the actual value, which is present at the output of the fourth computation device, of the torque.

The invention is based on equation (1), which is also used, by way of example, in DE 195 32 477 as the basis for the motor control system disclosed there and which makes it possible to calculate the torque from the concatenating stator flux and the stator current:

$$m = 3/2 \cdot p \cdot (\Psi \times i^-) \quad (1)$$

| m | Torque |
|---|---|
| p | Number of pole pairs |
| $\Psi^\angle$ | Space vector of the concatenated stator flux, related to the stator coordinate system |
| $i^\angle$ | Space vector of the stator current |
| x | Operator where $Z_1^\angle \times Z_2^\angle = \text{Re}\{Z_1^\angle\} \cdot \text{Im}\{Z_2^\angle\} - \text{Im}\{Z_1^\angle\} \cdot \text{Re}\{Z_2^\angle\}$ |

While the space vector $i^\angle$ of the stator current can be determined directly from the measurable stator terminal currents $i_{1,2,3}$ by using known coordinate transformations, the space vector $\Psi^\angle$ of the concatenated stator flux must be determined indirectly from the terminal voltage $u_{1,2,3}$ and the stator terminal currents $i_{1,2,3}$.

The rate of change of the space vector $\Psi^\angle$ of the concatenated stator flux is given by:

$$\frac{d\Psi^\angle}{dt} = u^\angle - R \cdot i^\angle \quad (2)$$

$u^\angle$—Space vector of the stator voltage
R—electrical resistance of the stator winding and supply lines The resistance R contained in equation (2) is either known as a parameter of the induction machine, or can be measured on the machine.

Finally, the space vector of the concatenated stator flux of the induction machine is obtained by integration as follows:

$$\Psi^\angle = \int_{t=0}^{\tau} (u^\angle - R \cdot i^\angle) dt \quad (3)$$

For an ideal induction machine connected to a balanced three-phase power supply system without any harmonics the flux concatenation once the transient processes in the complex numerical plane have decayed describes a circle with a voltage at the power supply system frequency and whose center coincides with the origin. If the machine is operated from frequency changers or three-phase controllers (soft starters), the flux concatenation space vector revolves at the frequency of the fundamental, with any harmonics being expressed as fluctuations about the circular shape.

The advantage of torque determination based on the equations (1), (2) and (3) is, in particular, that no information whatsoever about the induction machine is required apart from the resistance R, which can be determined easily, and the known number of pole pairs p.

The integration required in accordance with equation (4) is now preferably carried out numerically, for example with equidistant sampling based on the trapezoid rule:

$$\hat{\Psi}_k^\angle = \Psi_{k-1}^\angle + \frac{\Delta t}{2} \cdot \left( \frac{d\Psi_k^\angle}{dt} + \frac{d\Psi_{k-1}^\angle}{dt} \right) \quad (4)$$

$\Psi_{k-1}^\angle$ - calculated (filtered) space vector of the concatenated stator flux for sample step k-1

$\hat{\Psi}_k^\angle$ - unfiltered space vector of the concatenated stator flux for the sample step k $\Delta t$ - sample test width The rates of change $$\frac{d\Psi_k^\angle}{dt}, \quad \frac{d\Psi_{k-1}^\angle}{dt}$$

of the space vector $\Psi_{k,k-1}^\angle$ of the concatenated stator flux for sample steps k and k-1 are in this case determined directly from the space vectors $U_{k,k<1}^\angle$, $i_{k,k-1}^\angle$ of the stator terminal voltage and of the stator terminal current associated with these sample steps, using equation (2).

As already explained above, the unavoidable errors in the measurement of the current and voltage values, in the resistance R which is not known exactly (temperature influence) and in the residual error remaining with numerical integration methods leads to a remaining discrepancy and/or to drifting of the calculated concatenated stator flux, which is expressed in displacement of the flux concatenation circle from the origin of the complex numerical plane. In the end, this would lead to a remaining or increasing error in the determination of the torque.

In order to largely eliminate these undesirable effects, the numerically determined space vector of the concatenated stator flux is now, according to the invention, subjected to high-pass filtering. In the case of a numerical integration method, this is done by multiplication of the calculated space vector of the concatenated stator flux by a filter factor η, where η is only a little less than or equal to 1, for each sample step:

$$\Psi_k^\angle = \eta \cdot \left[ \Psi_{k-1}^\angle + \frac{\Delta t}{2} \cdot \left( \frac{d\Psi_k^\angle}{dt} + \frac{d\Psi_{k-1}^\angle}{dt} \right) \right] \quad (5)$$

η—filter factor to produce a high-pass filter

The filtered space vector $\Psi_k^\angle$, obtained in this way, for the concatenated stator flux is then used in a next step k+1 for calculating the unfiltered space vector, $\hat{\Psi}_{k-1}^\angle$ in accordance with equation (4).

Equation (6) can be used to find the magnitude of the filter factor $\eta$, with $\tau$ being a filter time constant which is preferably 1 to 10 times the power supply system period.

$$\eta = \exp\left(-\frac{\Delta t}{\tau}\right) \quad (6)$$

$\tau$—filter time constant

For operation on a three-phase power supply system with any given fundamental circular frequency $\omega$, there is a constant error both in the amplitude and in the phase angle (angle in the complex numerical plane), which is referred to in the following text as the fundamental error in the flux concatenation, after decay of the transient disturbances between the fundamental of the space vector calculated in accordance with equation (5), of the concatenated stator flux (flux concatenation), and the actual fundamental of the flux concatenation which is present in the induction machine. In this case, it is irrelevant whether the induction machine is supplied directly from the three-phase power supply system, from a soft starter or three-phase converter, from a frequency changer or from other controllers.

The constant fundamental error is now compensated for by multiplication of the flux concatenation calculated in accordance with equation (5) by a constant, complex correction factor $C^{\angle}$ so that, as a modification to equation (1), the following relationship is used for calculating the torque m:

$$m_k = 3/2 \cdot p \cdot (C^{\angle} \Psi_k^{\angle} \times i_k^{\angle}) \quad (7)$$

$C^{\angle}$—complex correction factor to compensate for errors.

The correction factor $C^{\angle}$ when using the integration rule in accordance with equation (5) becomes:

$$C^{\angle} = \frac{\frac{(\eta+1)\cdot\sin\beta}{\cos\beta+1} - j\cdot(\eta-1)}{\eta\cdot\beta} \text{ where } \beta = \omega \cdot \Delta t \quad (8)$$

$\omega$—circular frequency of the fundamental, to which the correction factor $C^{\angle}$ is matched If numerical integration methods other than that described in equation (5) are used, the complex correction factor $C^{\angle}$ must be adapted as appropriate.

BRIEF DESCRIPTION OF THE DRAWINGS

In order to explain the invention further, reference is made to the drawing, in which.

DETAILED DESCRIPTION OF PREFERRED EMBODIMENTS

Figure 1:
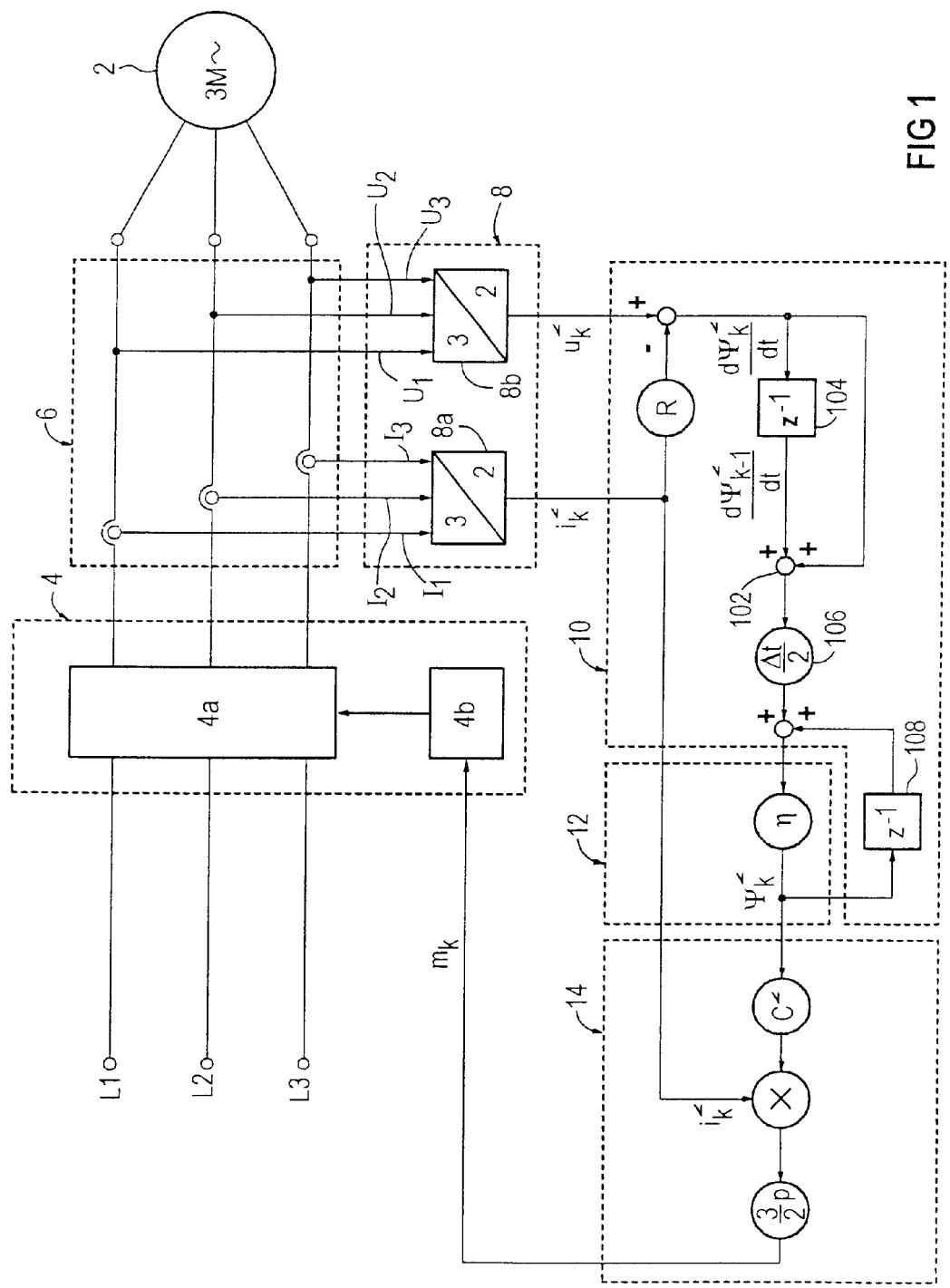
FIG. 1 shows a device for carrying out the method according to the invention, as a block diagram with a signal flow chart.

In the exemplary embodiment shown in FIG. 1, the stator of an induction machine 2 is connected via a control device 4 to the phases L1, L2, L3 of the three-phase power supply system. A measurement device 6 is used to measure both the stator terminal currents $i_1$, $i_2$, $i_3$ flowing in the respective windings of the stator of the induction machine 2 and the stator terminal voltages $u_1$, $u_2$, $u_3$ applied to the terminals of the stator, and these are passed to a first computation unit 8.

In the exemplary embodiment, the first computation unit 8 contains an analog/digital converter which is shown in detail but in which the measured values of the stator terminal currents and the stator terminal voltages are digitized at a predetermined sampling rate, so that the corresponding digital measured values occur at mutually equidistant time intervals $\Delta t$. The first computation unit contains transformation units 8a and 8b in which the stator terminal currents $i_1$, $i_2$, $i_3$ and the stator terminal voltages $u_1$, $u_2$, $u_3$ are used to calculate the respectively associated space vectors $u_k^{\angle}$, $i_k^{\angle}$ of the stator voltage and, respectively, stator voltage with a sample step k, and are produced at discrete time intervals $\Delta t$ at the output of the first computation unit 8.

In a second computation unit 10 which is connected downstream of the first computation unit 8, the space vectors $u_k^{\angle}$, $i_k^{\angle}$ of the stator current and, respectively, stator voltage and the stator resistance R are now used in equation (2) to calculate the rate of change $$\frac{d\Psi_k^{\angle}}{dt}$$

of the space vector $\Psi_k^{\angle}$ of the concatenated stator flux (stator flux space vector)—for the present sample step k, and these are added in an adder 102 to form the value (which is stored in a memory 104) of the rate of change $$\frac{d\Psi_{k-1}^{\angle}}{dt}$$

of the stator flux space vector from the previous sample step k−1. The sum value calculated in this way is multiplied in a multiplication stage 106 by half the sample width $\Delta t/2$. An initial value $\Psi_{k-1}^{\angle}$ (which is stored in an initial value memory 108) of the stator flux space vector is added to this value, and is output.

The unfiltered stator flux space vector $\hat{\Psi}_k^{\angle}$ calculated in this way is multiplied in a third computation unit 12 by the filter factor $\eta$, and the filtered stator flux space vector $\Psi_k^{\angle}$ obtained in this way is processed in a fourth computation unit 14 in accordance with equation (7) by multiplication by the complex correction factor (determined in accordance with equation (8)) as well as 1.5 times the number of pole pairs p with the present space vector $i_k^{\angle}$ of the stator current.

A calculated value of the present torque $m_k$ is now produced at the output of the fourth computation unit 14 and is supplied as the actual value to the control device 4, where it can be processed to regulate or control the torque m of the induction machine 2. For this purpose, the control device 4 advantageously comprises units 4a and 4b. For example the unit 4a is used as a motor controller and the unit 4b as a regulator.

The filtered stator flux space vector $\Psi_k^{\angle}$ is supplied to the initial value memory 108, and is then available as an initial value for the next calculation step k+1.

Figure 2:
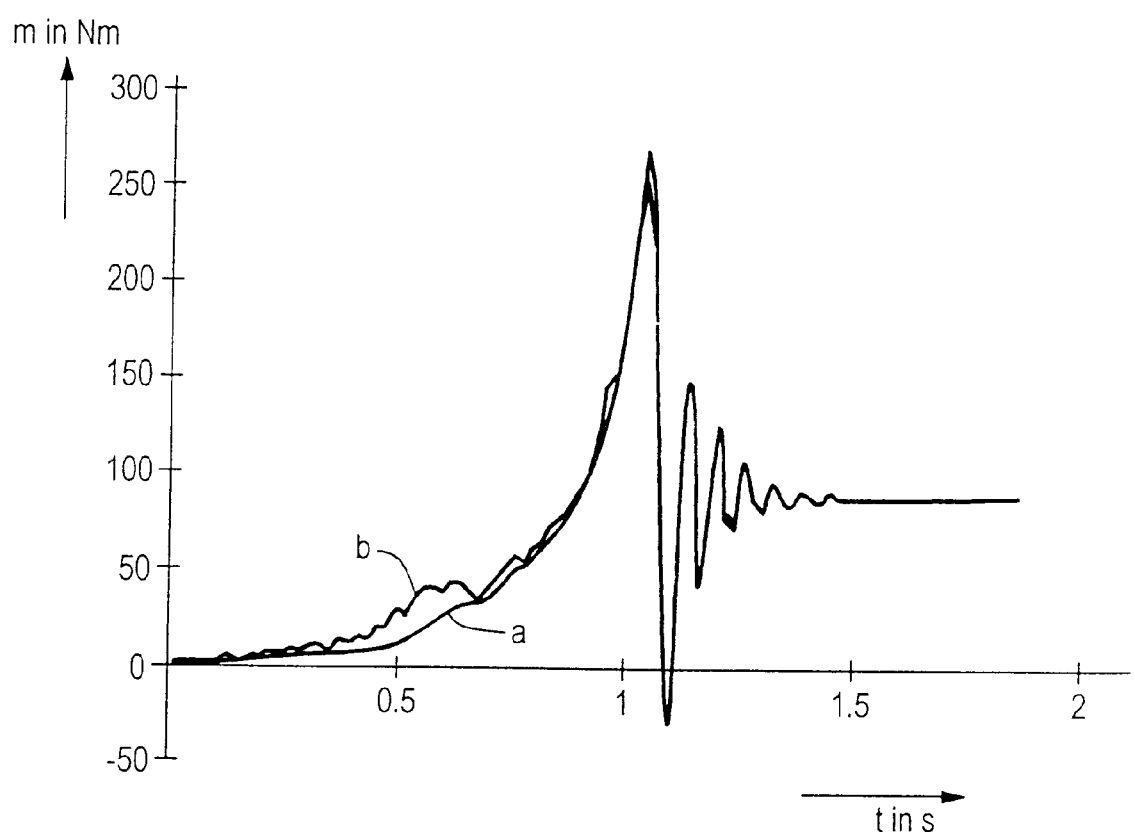
FIG. 2 shows a diagram in which the torque calculated according to the invention is plotted against the actual torque, with time, during the process of starting a 30 kW induction machine.

FIG. 2 uses a torque/time graph to show the actual torque m, corresponding to the curve a, and the torque determined according to the invention, corresponding to the curve b, plotted against time t. It can be seen from the figure that the discrepancy, which initially increases during the starting phase, is corrected so that, from about 0.7 seconds after the commencement of the starting process, the difference between the present torque and the calculated torque is in practice negligible. Calculation of the torque according to the invention thus makes it possible to virtually completely avoid errors in the form of remaining or increasing discrepancies between the calculated torque and the actual torque.

The invention means that the product of the complex correction factor $C^\angle$ and the numerically calculated space vector of the concatenated stator flux corresponds asymptotically to a substantially exact value of the concatenated stator flux, related to the fundamental of the power supply system voltage. This is achieved by defining the correction factor such that the corruption produced by the integration rule and the high-pass filtering disappears asymptotically.

The Z-transformation is advantageously used for calculating the complex correction factor:

First of all, the integration rule is Z-transformed:

$$\Psi^\angle(z) = \eta \cdot \left[\frac{\Psi^\angle(z)}{z} - \frac{\Delta t}{2} \cdot \left(\Xi^\angle(z) + \frac{\Xi^\angle(z)}{z}\right)\right] \tag{11}$$

$$\Psi^\angle(z) \cdot (z - \eta) = \eta \cdot \frac{\Delta t}{2} \cdot \Xi^\angle(z) \cdot (z - 1) \tag{12}$$

$$\Psi^\angle(z) = \eta \cdot \frac{\Delta t}{2} \cdot \frac{z-1}{z-\eta} \cdot \Xi^\angle(z) \tag{13}$$

Substitution of the Z-transform for $\Xi_k^\angle$ gives:

$$Z\{\Xi_k^\angle\} = Z\{\exp(j \cdot \beta \cdot k)\} = \frac{z}{z - \exp(j \cdot \beta)} \tag{14}$$

$$\Psi^\angle(z) = \eta \cdot \frac{\Delta t}{2} \cdot \frac{z+1}{z-\eta} \cdot \frac{z}{z - \exp(j \cdot \beta)} \tag{15}$$

In the following text, $\Psi^\angle(z)$ is broken down into partial fractions.

$$\Psi^\angle(z) = \eta \cdot \frac{\Delta t}{2} \cdot \frac{1}{\exp(j \cdot \beta) - \eta} \cdot \left[\frac{z \cdot (\exp(j \cdot \beta) + 1)}{z - \exp(j \cdot \beta)} - \frac{z \cdot (\eta + 1)}{z - \eta}\right] \tag{16}$$

The second term in the brackets with the denominator $(z-\eta)$ represents, after reverse transformation, a series with $\eta^k$ which, since $\eta<1$, disappears when k is large. On the other hand, the first term is converted back by reverse transformation once again to a space vector in the form $$\eta \cdot \frac{\Delta t}{2} \cdot \frac{\exp(j \cdot \beta) + 1}{\exp(j \cdot \beta) - \eta} \cdot \exp(j \cdot \beta \cdot k) \tag{17}$$

The complex correction factor $C^\angle$ must now be defined such that the numerically calculated space vector of the flux concatenation for large k corresponds to the exact integral of $\Xi_k^\angle$, that is to say $$\frac{\exp(j \cdot \beta \cdot k)}{j \cdot \omega}.$$

It follows from this that:

$$C^\angle \cdot \eta \cdot \frac{\Delta t}{2} \cdot \frac{\exp(j \cdot \beta) + 1}{\exp(j \cdot \beta) - \eta} = \frac{1}{j \cdot \omega} \tag{18}$$

$$C^\angle = \frac{2 \cdot [\exp(j \cdot \beta) - \eta]}{j \cdot \eta \cdot \beta \cdot [\exp(j \cdot \beta) + 1]} \tag{19}$$

Further conversions, which are used to produce a real denominator and separate real and imaginary parts, finally result in equation (8), which has already been quoted above, for the complex correction factor:

$$C^\angle = \frac{\frac{(\eta+1) \cdot \sin\beta}{\cos\beta + 1} + j \cdot (\eta - 1)}{\eta \cdot \beta} \quad \text{where } \beta = \omega \cdot \Delta t$$

The flux concatenation space vector $\Psi_k^\angle$ which is multiplied by the complex correction factor $C^\angle$ and is calculated by means of the above integration rule tends asymptotically to a substantially exact value as the value k for the fundamental of the power supply voltage increases.

The complex correction factor $C^\angle$ need be calculated only once providing the following variables are known circular frequency of the fundamental of the power supply system voltage ω
  filter factor η
  sample step width Δt.

It can then be stored in a read-only memory. Only one complex multiplication need be carried out to determine the torque during the running time.

If other algorithms are used to calculate the integral or to provide the high-pass filtering, this will necessarily result in other complex correction factors $C^{110}$ as well. These can likewise be calculated using the above rule.

In one practical example, the values are as follows:

High-pass filtering factor η=0.999
Circular frequency of the fundamental of the power supply system voltage ω=2*π*f=314.159 s$^{-1}$
Sample step width Δt: 100 μs
This results in the following complex correction factor:

$C^\angle$=1.0005827965−j*0.018628515

If the variables are calculated in a computer, the rules can be satisfied nearly exactly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for determining the torque of an induction machine, comprising:
   determining a filtered space vector of a concatenated stator flux, from which a DC component has been removed, by integrating and then high-pass filtering stator terminal voltages and stator terminal currents of the induction machine;
   multiplying the filtered space vector by a complex correction factor to correct any phase and amplitude errors of the space vector resulting from the integration and high pass filtering; and
   determining the torque of the induction machine based upon the corrected space vector.

2. The method as claimed in claim 1, wherein the complex correction factor is chosen such that the product of the correction factor and a numerically calculated space vector of the concatenated stator flux corresponds asymptotically to an substantially exact value, related to a fundamental of a power supply system voltage of the induction machine.

3. The method as claimed in claim 2, wherein the correction factor is dimensioned such that corruption produced by integration and high-pass filtering disappears asymptotically.

4. The method as claimed in claim 3, further comprising:
a) measuring stator terminal voltages and stator terminal currents at predetermined time intervals,
b) using the measured values of the stator terminal voltages and the stator terminal currents to calculate a space vector of the stator voltage and, respectively, a space vector of the stator current,
c) using the space vector of the stator voltage and the space vector of the stator current together with an initial value for the space vector of the concatenated stator flux to determine, by numerical integration, an unfiltered space vector of the concatenated stator flux,
d) multiplying the unfiltered space vector of the concatenated stator flux by a predetermined filter factor for high-pass filtering,
e) using the filtered space vector, determined in this way, of the concatenated stator flux as the initial value for the space vector of the concatenated stator flux for the next numerical integration step, and
f) multiplying the filtered space vector by the complex correction factor in order to calculate a present torque of the induction machine.

5. A device for carrying out the method as claimed in claim 3, including:
a measurement device for detecting the stator terminal voltages and the stator terminal currents; and
a computation device for determining a filtered space vector for the concatenated stator flux, wherein the computation device is designed to multiply the filtered space vector by a complex correction factor and to calculate the torque from the filtered space vector multiplied by the complex correction factor.

6. The device claimed in claim 3, wherein the computation device includes,
a first computation unit for calculating a space vector of the stator voltage and a space vector of the stator current,
a second computation unit for calculating the unfiltered space vector of the concatenated stator flux by numerical integration from the space vectors of the stator voltage and of the stator current and from an initial value of the unfiltered space vector of the concatenated stator flux stored in an initial value memory,
a third computation unit, connected downstream therefrom, for calculating the filtered space vector of the concatenated stator flux by multiplication of the unfiltered space vector of the concatenated stator flux by a filter factor, and
a fourth computation unit for calculating the torque from the space vector of the stator current, the filtered space vector of the concatenated stator flux, a number of pole pairs and the complex correction factor, with the filtered space vector of the concatenated stator flux being passed to an input of the initial value memory.

7. The method as claimed in claim 2, wherein the filter factor ($\eta$) is determined from a duration of the time intervals ($\Delta t$) and from a filter time constant ($\tau$) using the equation $$\eta = \exp\left(-\frac{\Delta t}{\tau}\right) \quad (6)$$

with the filter time constant ($\tau$) being 1 to 10 times a power supply system period.

8. A device for carrying out the method as claimed in claim 7, including:
a measurement device for detecting the stator terminal voltages and the stator terminal currents; and
a computation device for determining a filtered space vector for the concatenated stator flux, wherein the computation device is designed to multiply the filtered space vector by a complex correction factor and to calculate the torque from the filtered space vector multiplied by the complex correction factor.

9. The method as claimed in claim 2, further comprising:
a) measuring stator terminal voltages and stator terminal currents at predetermined time intervals,
b) using the measured values of the stator terminal voltages and the stator terminal currents to calculate a space vector of the stator voltage and, respectively, a space vector of the stator current,
c) using the space vector of the stator voltage and the space vector of the stator current together with an initial value for the space vector of the concatenated stator flux to determine, by numerical integration, an unfiltered space vector of the concatenated stator flux,
d) multiplying the unfiltered space vector of the concatenated stator flux by a predetermined filter factor for high-pass filtering,
e) using the filtered space vector, determined in this way, of the concatenated stator flux as the initial value for the space vector of the concatenated stator flux for the next numerical integration step, and
f) multiplying the filtered space vector by the complex correction factor in order to calculate a present torque of the induction machine.

10. A device for carrying out the method as claimed in claim 2, including:
a measurement device for detecting the stator terminal voltages and the stator terminal currents; and
a computation device for determining a filtered space vector for the concatenated stator flux, wherein the computation device is designed to multiply the filtered space vector by a complex correction factor and to calculate the torque from the filtered space vector multiplied by the complex correction factor.

11. The device claimed in claim 2, wherein the computation device includes,
a first computation unit for calculating a space vector of the stator voltage and a space vector of the stator current,
a second computation unit for calculating the unfiltered space vector of the concatenated stator flux by numerical integration from the space vectors of the stator voltage and of the stator current and from an initial value of the unfiltered space vector of the concatenated stator flux stored in an initial value memory,
a third computation unit, connected downstream therefrom, for calculating the filtered space vector of the concatenated stator flux by multiplication of the unfiltered space vector of the concatenated stator flux by a filter factor, and
a fourth computation unit for calculating the torque from the space vector of the stator current, the filtered space vector of the concatenated stator flux, a number of pole pairs and the complex correction factor, with the filtered space vector of the concatenated stator flux being passed to an input of the initial value memory.

12. The device as claimed in claim 11, wherein a control device is provided for controlling the torque of the induction machine as a function of the actual value, which is present at an output of the fourth computation device, of the torque.

13. The method as claimed in claim 1, further comprising:
   a) measuring stator terminal voltages and stator terminal currents at predetermined time intervals,
   b) using the measured values of the stator terminal voltages and the stator terminal currents to calculate a space vector of the stator voltage and, respectively, a space vector of the stator current,
   c) using the space vector of the stator voltage and the space vector of the stator current together with an initial value for the space vector of the concatenated stator flux to determine, by numerical integration, an unfiltered space vector of the concatenated stator flux,
   d) multiplying the unfiltered space vector of the concatenated stator flux by a predetermined filter factor for high-pass filtering,
   e) using the filtered space vector, determined in this way, of the concatenated stator flux as the initial value for the space vector of the concatenated stator flux for the next numerical integration step, and
   f) multiplying the filtered space vector by the complex correction factor in order to calculate a present torque of the induction machine.

14. A device for carrying out the method as claimed in claim 13, including:
   a measurement device for detecting the stator terminal voltages and the stator terminal currents; and
   a computation device for determining a filtered space vector for the concatenated stator flux, wherein the computation device is designed to multiply the filtered space vector by a complex correction factor and to calculate the torque from the filtered space vector multiplied by the complex correction factor.

15. The device claimed in claim 13, wherein the computation device includes,
   a first computation unit for calculating a space vector of the stator voltage and a space vector of the stator current,
   a second computation unit for calculating the unfiltered space vector of the concatenated stator flux by numerical integration from the space vectors of the stator voltage and of the stator current and from an initial value of the unfiltered space vector of the concatenated stator flux stored in an initial value memory,
   a third computation unit, connected downstream therefrom, for calculating the filtered space vector of the concatenated stator flux by multiplication of the unfiltered space vector of the concatenated stator flux by a filter factor, and
   a fourth computation unit for calculating the torque from the space vector of the stator current, the filtered space vector of the concatenated stator flux, a number of pole pairs and the complex correction factor, with the filtered space vector of the concatenated stator flux being passed to an input of the initial value memory.

16. The device as claimed in claim 15, wherein a control device is provided for controlling the torque of the induction machine as a function of the actual value, which is present at an output of the fourth computation device, of the torque.

17. A device for carrying out the method as claimed in claim 1, including:
   a measurement device for detecting the stator terminal voltages and the stator terminal currents; and
   a computation device for determining a filtered space vector for the concatenated stator flux, wherein the computation device is designed to multiply the filtered space vector by a complex correction factor and to calculate the torque from the filtered space vector multiplied by the complex correction factor.

18. The device as claimed in claim 17, wherein the complex correction factor ($C^L$) is:

$$C^L = \frac{\frac{(n+1)\cdot \sin\beta}{\cos\beta + 1} + j\cdot(\eta - 1)}{\eta \cdot \beta} \text{ where } \beta = \omega \cdot \Delta t \quad (8)$$

where the following secondary conditions apply to the integration and high-pass filtering:

$$\Psi_k^L = \eta \cdot \left[\Psi_{k-1}^L + \frac{\Delta t}{2} \cdot \left(\frac{d\Psi_k^L}{dt} + \frac{d\Psi_{k-1}^L}{dt}\right)\right] \quad (5)$$

$$\eta = \exp\left(-\frac{\Delta t}{\tau}\right) \quad (6)$$

where $\tau$=filter time constant, $\eta$ is a predetermined filter factor for high-pass filtering, and $\hat{\Psi}_k^L$ is the filtered space vector.

19. The device claimed in claim 17, wherein the computation device includes,
   a first computation unit for calculating a space vector of the stator voltage and a space vector of the stator current,
   a second computation unit for calculating the unfiltered space vector of the concatenated stator flux by numerical integration from the space vectors of the stator voltage and of the stator current and from an initial value of the unfiltered space vector of the concatenated stator flux stored in an initial value memory,
   a third computation unit, connected downstream therefrom, for calculating the filtered space vector of the concatenated stator flux by multiplication of the unfiltered space vector of the concatenated stator flux by a filter factor, and
   a fourth computation unit for calculating the torque from the space vector of the stator current, the filtered space vector of the concatenated stator flux, a number of pole pairs and the complex correction factor, with the filtered space vector of the concatenated stator flux being passed to an input of the initial value memory.

20. The device as claimed in claim 19, wherein a control device is provided for controlling the torque of the induction machine as a function of the actual value, which is present at an output of the fourth computation device, of the torque.

21. A method of determining a torque of an induction machine, comprising:
   multiplying a filtered space vector by a complex factor to correct any errors of the space vector; and
   determining the torque of the induction machine based upon the corrected space vector.

22. The method according to claim 21, wherein the complex factor corrects any phase and amplitude errors of the space vector.

23. The method according to claim 21, wherein the errors of the space vectors are a integration and high pass filtering.

* * * * *